(12) United States Patent
Adrangi et al.

(10) Patent No.: US 10,809,999 B2
(45) Date of Patent: Oct. 20, 2020

(54) SECURE FIRMWARE UPGRADE FOR CELLULAR IOT

(71) Applicant: INTEL IP CORPORATION, Santa Clara, CA (US)

(72) Inventors: Farid Adrangi, Lake Oswego, OR (US); Puneet Jain, Hillsboro, OR (US); Muthaiah Venkatachalam, Beaverton, OR (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/575,906

(22) PCT Filed: Jun. 29, 2016

(86) PCT No.: PCT/US2016/040027
§ 371 (c)(1),
(2) Date: Nov. 21, 2017

(87) PCT Pub. No.: WO2017/019238
PCT Pub. Date: Feb. 2, 2017

(65) Prior Publication Data
US 2018/0150289 A1 May 31, 2018

Related U.S. Application Data

(60) Provisional application No. 62/199,066, filed on Jul. 30, 2015.

(51) Int. Cl.
*G06F 8/65* (2018.01)
*H04L 29/08* (2006.01)
(Continued)

(52) U.S. Cl.
CPC ............... *G06F 8/65* (2013.01); *H04L 67/26* (2013.01); *H04L 67/34* (2013.01); *H04W 4/50* (2018.02);
(Continued)

(58) Field of Classification Search
CPC . G06F 8/65; H04W 8/22; H04W 4/70; H04W 4/80; H04W 4/50; H04L 67/34; H04L 67/26
(Continued)

(56) References Cited

U.S. PATENT DOCUMENTS

2014/0323178 A1* 10/2014 Wei .................. H04W 76/16
455/552.1
2015/0173112 A1* 6/2015 Cui .................. H04W 12/06
370/329
(Continued)

FOREIGN PATENT DOCUMENTS

CN            104580360 A      4/2015

OTHER PUBLICATIONS

Ericsson, "Traffic Models for the Cellular IoT Study", Tdoc GP-140909, 3GPP TSG GERAN#64, San Francisco, CA, USA, Agenda Item 7.2.5.3.4, Nov. 17-21, 2014, 8 pages.
(Continued)

*Primary Examiner* — Congvan Tran
(74) *Attorney, Agent, or Firm* — Stoel Rives LLP

(57) ABSTRACT

The present disclosure provides systems for updating firmware of a CIoT device. The CIoT device activates, based on one or more activation commands received by the first receiver and the second receiver. The CIoT device connects by the second receiver and the second transmitter, to a device. The CIoT device receives, by the second receiver, from the device, a firmware upgrade file. A CIoT device deactivates the second receiver.

27 Claims, 9 Drawing Sheets

(51) Int. Cl.
*H04W 4/50* (2018.01)
*H04W 4/70* (2018.01)
*H04W 4/80* (2018.01)
*H04W 8/22* (2009.01)

(52) U.S. Cl.
CPC .............. *H04W 4/70* (2018.02); *H04W 4/80* (2018.02); *H04W 8/22* (2013.01)

(58) Field of Classification Search
USPC ...... 455/418–420, 402.1–2, 406, 450, 452.1, 455/517–518
See application file for complete search history.

(56) References Cited

U.S. PATENT DOCUMENTS

| | | | |
|---|---|---|---|
| 2015/0237071 A1* | 8/2015 | Maher | H04L 63/20 726/1 |
| 2015/0304113 A1* | 10/2015 | Nix | H04L 9/3066 713/176 |
| 2016/0007288 A1* | 1/2016 | Samardzija | H04W 52/0229 370/311 |
| 2016/0100350 A1* | 4/2016 | Laraqui | H04W 4/70 370/328 |
| 2016/0105860 A1* | 4/2016 | Li | H04W 4/70 370/350 |
| 2016/0195881 A1* | 7/2016 | Britt | G08C 17/02 700/276 |
| 2016/0286409 A1* | 9/2016 | Kravets | H04L 67/12 |
| 2016/0364223 A1* | 12/2016 | Vandikas | H04W 4/50 |
| 2017/0006528 A1* | 1/2017 | Bari | H04W 48/16 |
| 2017/0017822 A1* | 1/2017 | Zimmerman | G06K 7/1452 |

OTHER PUBLICATIONS

PCT/US2016/040027, International Search Report and Written Opinion, dated Sep. 8, 2016, 15 pages.

* cited by examiner

SECURE FIRMWARE UPGRADE FOR CELLULAR IOT

RELATED APPLICATIONS

This application is a national phase application of International Patent Application No. PCT/US2016/040027, filed Jun. 29, 2016, which claims the benefit under 35 U.S.C. § 119(e) of U.S. Provisional Application No. 62/199,066 filed Jul. 30, 2015, both of which are hereby incorporated by reference herein in their entirety.

TECHNICAL FIELD

The present disclosure relates to the firmware upgrades for cellular internet of things (CIoT). In particular, the present disclosure relates to end-to-end firmware upgrades for CIoT.

BACKGROUND

3rd Generation Partnership Project (3GPP) may be carrying out work items to enable usage scenarios like home automation (including security, convenience, energy packages), industry automation, smart cities with low power devices (e.g., a battery life of several years), and the like, that may be easily installed and operated in challenging coverage conditions, e.g., indoors and basements. These devices may be referred to as cellular IOT (CIoT) devices which may represent a significant growth opportunity for low power connected/smart devices, including wireless sensors, smart meters, and dedicated microprocessors among others, that may span across different ecosystems with diverse business models.

DETAILED DESCRIPTION OF PREFERRED EMBODIMENTS

Figure 1:
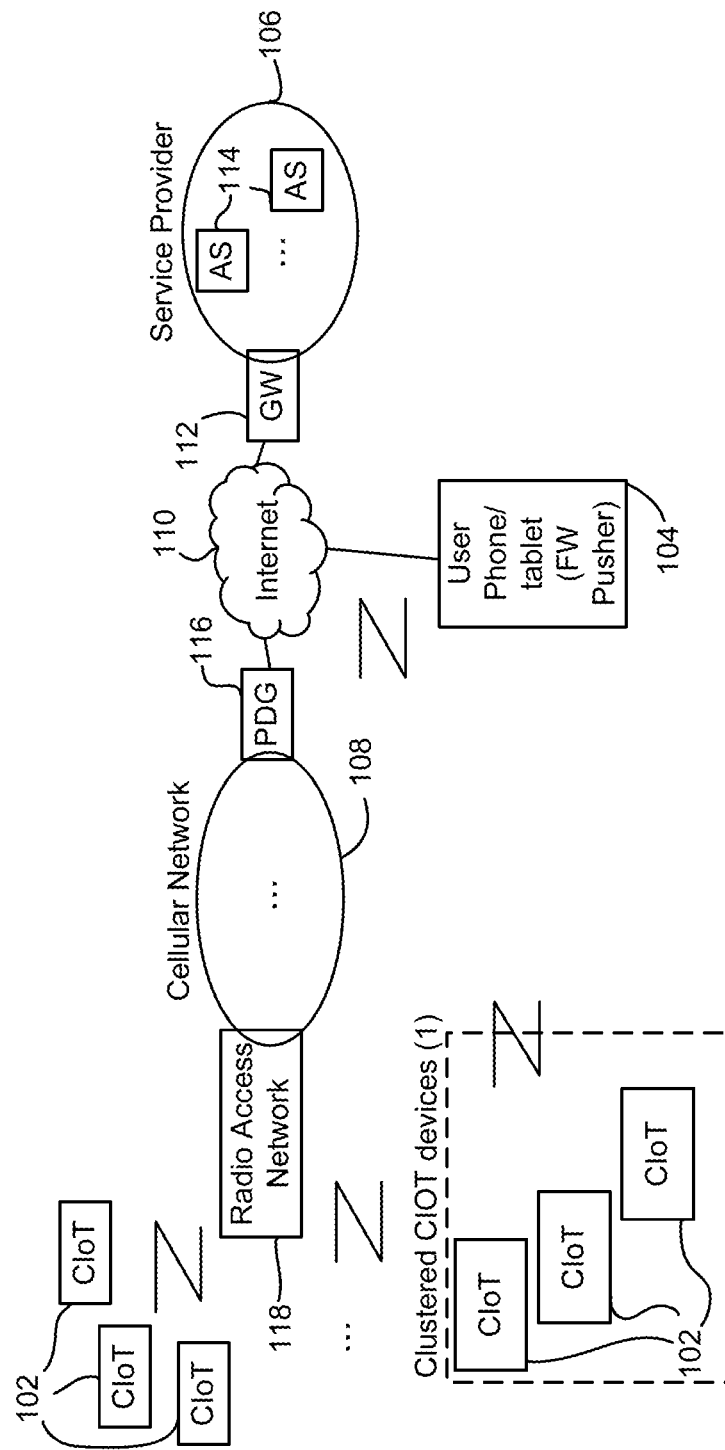
FIG. 1 is a system diagram for secure firmware upgrade for a CIoT device according to one embodiment.

In one embodiment, 3GPP architecture framework for CIoT is used to provide a secure end-to-end firmware upgrade for low throughput and low power CIoT devices. The firmware upgrade can be provided to a CIoT device via a firmware pusher device. The firmware pusher device places the CIoT device in a download mode by communicating with a first radio of the CIoT device, the first radio receiving a request to be placed in a download mode via an eNB. The firmware pusher device can push the firmware to the CIoT device via a second radio of the CIoT device.

A CIoT device that is configured to receive firmware upgrades via a cellular radio may face a number of challenges. For example, if the cellular radio is configured to receive a firmware update file via a low throughput and low power radio, then the firmware update file may be limited by size. Furthermore, if the cellular radio is configured to receive the firmware update file via the low throughput and low power radio, then an end-to-end update of the firmware may not be possible. For example, a firmware pusher device may not have a radio that is compatible with the low throughput and low power radio of the CIoT device. If a cellular radio is a high power radio, then the CIoT device may be limited by the life span of a battery that powers the CIoT device.

By configuring a CIoT device to receive commands via a low throughput and low power radio and firmware update files via a high throughput and high power radio, it provides the ability to deactivate the high throughput and high power radio until a command is received to activate the high throughput and high power radio. Deactivating the high throughput and high power radio provides power savings over a CIoT device that does not deactivate the high throughput and high power radio. Furthermore, receiving the firmware update file over the high throughput and high power radio eliminates the file size restrictions associated with transferring the firmware update file via the low throughput and low power radio.

Reference is now made to the figures in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

FIG. 1 is a system diagram for secure firmware upgrade for a CIoT device according to one embodiment. FIG. 1 includes a plurality of CIoT devices 102, a firmware pusher device (e.g., FW pusher) 104, a service provider 106, a cellular network 108, an internet (e.g., world wide web) 110, an internet gateway 112, a plurality of application servers 114, a 3GPP packet data gateway (PDG) 116, and a radio access network 118. As used herein, the radio access network 118 can be part of a telecommunication system. The radio access network 118 can implement a radio access technology. The radio access network 118 provides access to the cellular network 108.

The CIoT device 102 is a user equipment (UE) configured to communicate via at least a low throughput and low power radio. The UE may include any type of communications and/or computing device. Example UEs include phones, smartphones, personal digital assistants (PDAs), tablet computers, notebook computers, ultrabook computers, and the like. The UEs may include a plurality of applications installed and running on the UEs which may periodically communicate data over the E-UTRAN and/or an evolved packet core (EPC) using low throughput and low power radios. The UEs include devices configured to communicate using a 3GPP standard such as universal mobile telecommunication system (UMTS), LTE, LTE-Advanced (LTE-A), or the like. In some embodiments, the UEs may include a mobile wireless device configured to communicate based on any other wireless communication standard.

As used herein, the CIoT devices 102 are equipped with at least two different types of radios. For example, the CIoT devices 102 are equipped with a high throughput and high power radio (e.g., low range and high throughput radio) and a low throughput and low power radio (e.g., cellular radio). A low range and high throughput radio can be an alternate high throughput radio such as Bluetooth Low Energy (BLE) radio, a low power WiFi radio, and/or Zigbee radio, among other types of low range and high throughput radios. The embodiments described herein are in reference to a BLE radio. However, the BLE radio is used as an example and is not intended to be limiting. Other types of low range high throughput radios can be used instead.

The CIoT devices 102 automatically activate their associated BLE radios when a firmware upgrade is needed. In some embodiments, the firmware pusher device 104 is used to automatically activate the BLE radio in the CIoT device. The firmware pusher device 104 is also a UE configured to communicate via at least a high throughput and high power radio. For example, the firmware pusher device 104 can be a phone (e.g., smart phone) or a tablet, among other possible UE. The firmware pusher device 104 includes hardware and software to push a firmware upgrade file to the CIoT device. A phone or personal computer such as a notebooks and/or tablets (e.g., UE) may run a firmware pusher app and may be equipped with BLE, to push an updated firmware file to, for example, the individual CIoT device(s) 102 or the clustered CIoT devices 102.

Figure 6:
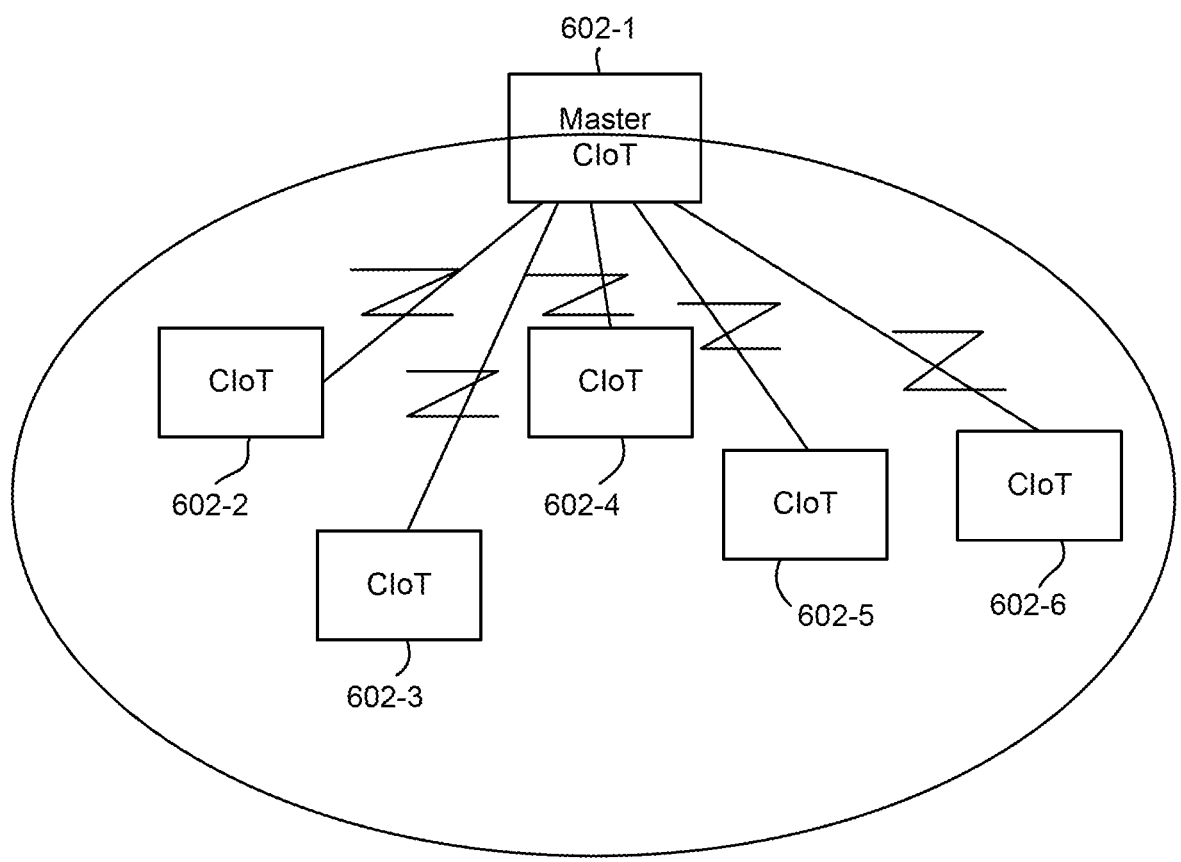
FIG. 6 is a block diagram showing a master CIoT device and a plurality of other CIoT devices according to one embodiment.

FIG. 1 illustrates a portion of the CIoT devices 102 in a cluster and the other CIoT devices 102 not in a cluster. At least one of the CIoT devices 102 in a cluster can be a master CIoT device that can distribute the firmware upgrade file received from the firmware pusher device 104 to the other CIoT devices 102 in the cluster. FIG. 6 further describes clusters of CIoT devices 102.

The firmware pusher device 104 can include hardware and software configured to dedicatedly push firmware upgrade files. Such a firmware pusher device 104 is referred to as a dedicated pusher device. A dedicated pusher device may be unable to perform other functions other than pushing firmware upgrade files. The firmware pusher device 104 can also be a multipurpose firmware pusher device. A multipurpose firmware pusher device can include hardware and software to perform a number of other functions other than pushing a firmware upgrade file. An example of a multipurpose firmware pusher device is a smartphone.

In some embodiments, the firmware pusher device 104 is also equipped with at least two radios. For example, the firmware pusher device 104 can be equipped with two different types of high throughput and high power radios. A first high throughput and high power radio can be a cellular radio or a wifi radio and a second high throughput and high power radio can be a BLE radio. As used herein, a radio describes at least a receiver and a transmitter. As such, the firmware pusher device 104 can include a cellular radio (e.g., high throughput and high power radio) including a first receiver and a first transmitter and a BLE radio including a second receiver and a second transmitter. The firmware pusher device 104 can communicate with the internet 110 using the cellular radio and with the CIoT devices 102 using the BLE radio.

In some embodiments, the firmware pusher device 104 communicates with the internet 110 via a landline and with the CIoT devices 102 via a BLE radio. For example, a desktop computer that is not equipped with a cellular radio may be coupled to the internet 110 via a landline.

The firmware pusher device 104 receives the firmware upgrade file from the service provider 106 via the internet gateway 112 and the internet 110. The firmware upgrade file can be stored in at least one of the application servers 114. As such, the application servers 114 can determine when the CIoT devices 102 are due for a firmware upgrade.

The firmware pusher device 104 provides commands to the CIoT devices 102 by communicating with the service provider 106 and/or the application servers 114. For example, the firmware pusher device 104 can provide commands intended for the CIoT devices 102 to the service provider 106. The service provider 106 can forward the commands to the application servers 114. The application servers 114 can forward the commands to the CIoT devices 102. The commands can travel from the application servers 114 via the internet gateway 112, the internet 110, the PDG 116, the cellular network 108, and/or the radio access network 118 to the CIoT devices 102.

The firmware pusher device 104 can also communicate directly with the CIoT devices 102 to push the firmware update file. The firmware pusher device 104 can employ an open mobile alliance (OMA) lightweight (LW) machine to machine (M2M) protocol to communicate with the CIoT devices 102. In some embodiments, the firmware pusher device 104 can employ different protocols to communicate with the CIoT devices 102. The firmware pusher device 104 can also communicate with the CIoT devices 102 to establish an authenticated session and/or to establish a secure session. An authenticated session and the secure session are further described in FIG. 5.

Figure 2:
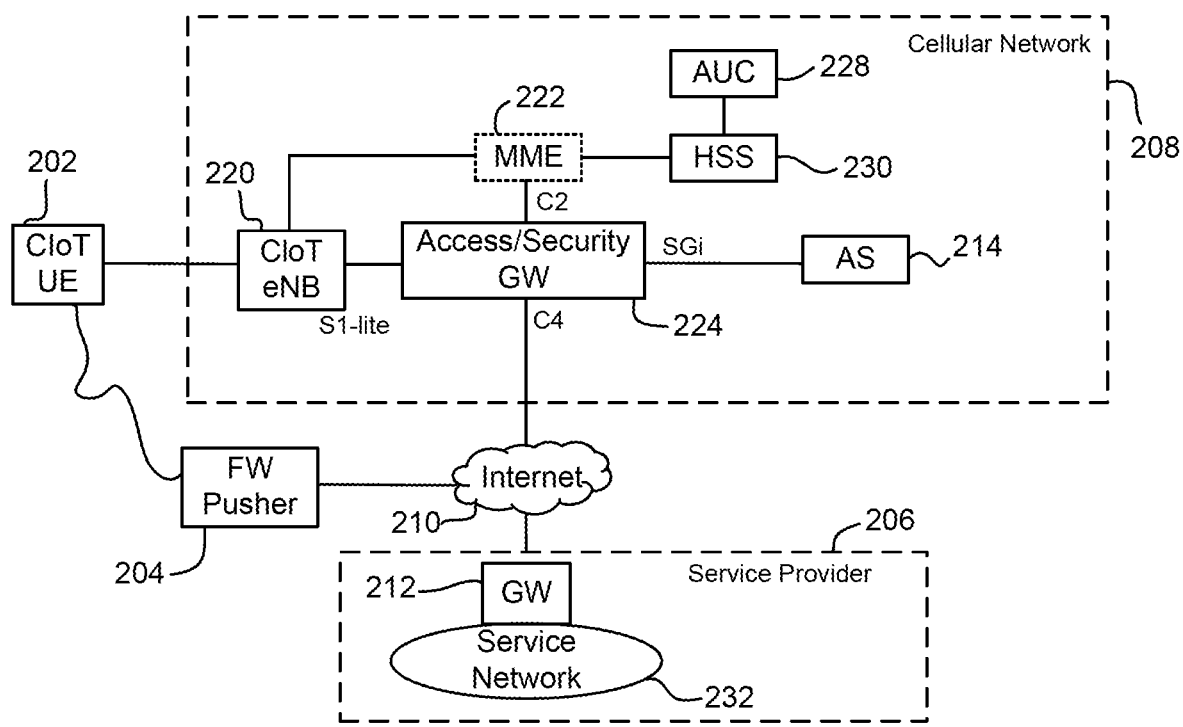
FIG. 2 is a system diagram for secure firmware upgrade for a CIoT device according to one embodiment.

FIG. 2 is a system diagram for secure firmware upgrade for a CIoT device according to one embodiment. FIG. 2 includes a CIoT device (e.g., UE) 202, a firmware pusher device 204, a service provider 206, a cellular network 208, an internet 210, an internet gateway 212, and an application server (AS) 214 which are analogous to the CIoT device 102, the firmware pusher 104, the service provider 106, the cellular network 108, the internet 110, the internet gateway 112, and the application servers 114 in FIG. 1. FIG. 2 also includes, a CIoT eNB 220, a mobile management entity (MME) 222, an access/security gateway 224, an authentication center (AUC) 228, a home subscriber server (HSS) 230, and a service network 232.

The cellular network 208 can include the CIoT eNB 220, the MME 222, the access/security gateway 224, the AUC 228, the HSS 230, and the AS 214. The service provider 206 can include the gateway 212 and the service network 232.

An eNB is a base station that can include multiple antennas (e.g., a sector antenna array) to transmit/receive data to/from UEs. An eNB can be configured specifically to communicate with the CIoT device 202 (e.g., CIoT UE) and/or the firmware pusher device 204. An eNB that is configured to transmit/receive data to/from the CIoT device 202 is referred to as the CIoT eNB 220.

The CIoT eNB 220 is equipped with a low throughput and low power radio including a first receiver to receive low throughput and low power signals and a transmitter to transmit low throughput and low power signals. Although not shown, the cellular network 208 can include an eNB configured to communicate with the firmware pusher device 204 via a high throughput and high power radio.

In the example provided in FIG. 2, the CIoT UE 202 can communicate with the CIoT eNB 220. The CIoT eNB 220 can communicate with the access/security gateway 224 via an S1-lite interface and/or the MME 222. The access/security gateway 224 can communicate with the firmware pusher device 204 and the MME 222 via a C2 interface and through the internet 210, with the AS 214 via an SGi interface, and the gateway 212 via a C4 interface. The MME 222 can communicate with the HSS 230. The HSS 230 can communicate with the AUC 228.

The firmware pusher device 204 can communicate with the access/security gateway 224. The firmware pusher device 204 can also communicate with the service provider 206 and the service network 232 via communications with the gateway 212.

FIG. 1 shows the AS 114 as being part of the service provider 106 in one embodiment. FIG. 2 shows the AS 214 as being part of the cellular network 208 in a different embodiment. In some embodiments, the AS 214 can be part of the cellular network 208 and/or the service provider 206.

The CIoT UE 202 can authenticate itself to the cellular network 208 via the HSS 230 and the AUC 228. The HSS 230 can store subscriber information such as the subscriber identifications (IDs) and credentials. The AUC 228 can store authentication parameters and/or vectors for each record in the HSS 230. The CIoT UE 202 and/or the firmware pusher device 204 provides an ID and a credential stored in a corresponding SIM card to the HSS 230 and/or the AUC 228. The CIoT UE 202 and/or the firmware pusher device 204 can further identify the cellular network 208 by communicating with the HSS 230 and the AUC 228. Authentication with the cellular network 208 is different than authentication between the CIoT UE 202 and the firmware pusher device 204.

The MME 222 provides load balancing and re-balancing to UE such as the CIoT 202 and/or the firmware pusher device 204 among other services that the MME 222 provides to the UE. The MME 222 is shown in a dashed square to identify that the MME 222 can be an MME with a full complement of functions or an MME with a subset of the full complement of functions.

Figure 3:
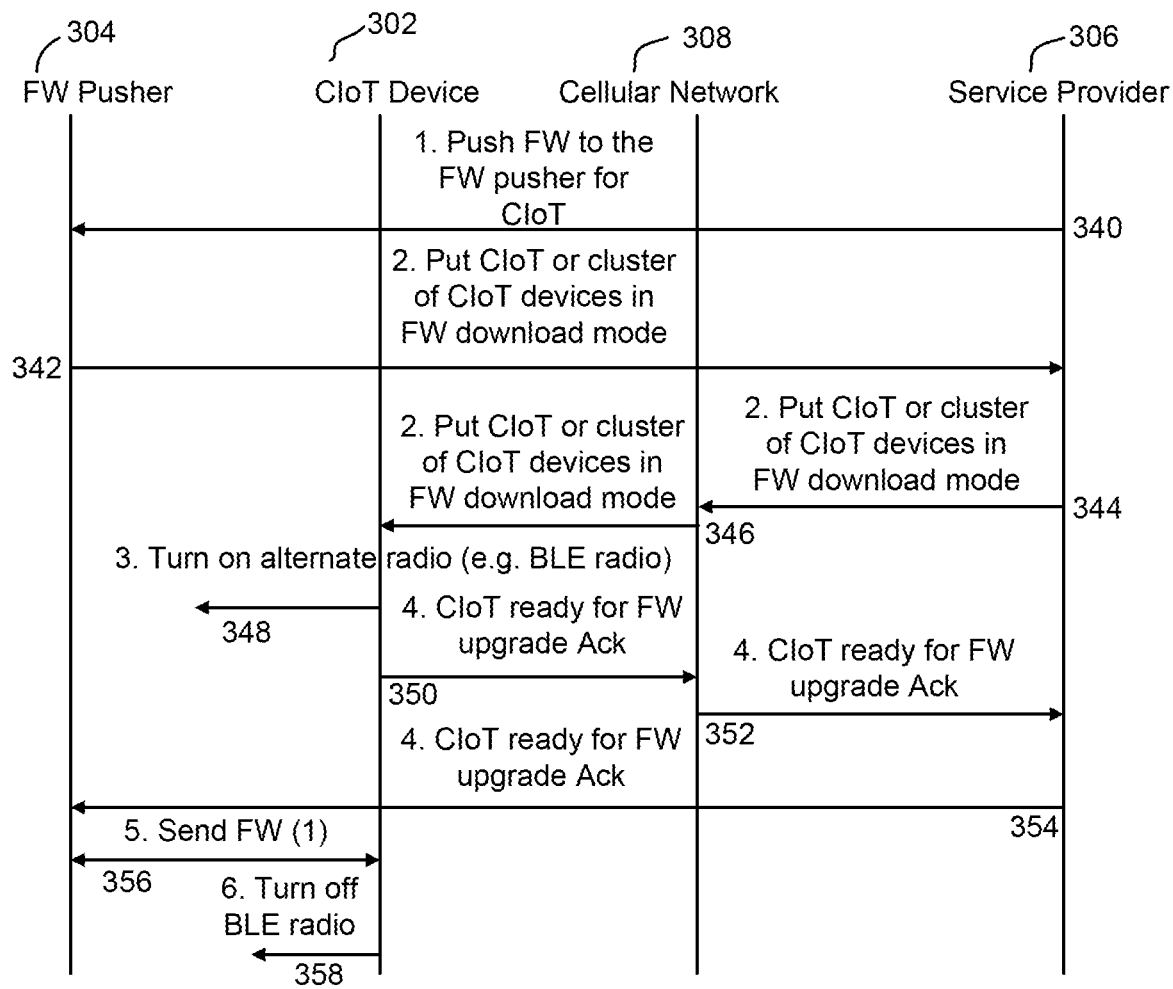
FIG. 3 is a timing diagram for updating a CIoT device with a firmware update file according to one embodiment.

FIG. 3 is a timing diagram for updating a CIoT device with a firmware update file according to one embodiment. FIG. 3 includes a CIoT device 302, a firmware pusher device 304, a service provider 306, and a cellular network 308 which are analogous to the CIoT device 102, the firmware pusher device 104, the service provider 106, and the cellular network 108 in FIG. 1. As used herein, reference to the service provider 306 can also include a reference to an application server.

The service provider 306 can determine that the CIoT device 302 is due for a firmware update. In some embodiments, the CIoT device 302 can communicate with the service provider 306 via a low throughput and low power radio to inform the service provider 306 that the CIoT device 302 is ready for a firmware update.

In some embodiments, the firmware pusher device 304 can determine that the CIoT device 302 is due for a firmware update. The determination of whether the CIoT device 302 is due for an update can be made in view of an install policy.

The service provider 306 pushes 340 a firmware update file to the firmware pusher device 304. The service provider 306 pushes 340 the firmware update file via a high throughput and high power radio (e.g., transmitter) of an eNB.

The firmware pusher device 304 receives the firmware update file via a cellular radio of the firmware pusher device 304. As used herein, a cellular radio can be a high throughput and high power radio or a low throughput and low power radio depending on the type of cellular radio employed.

The firmware pusher device 304 requests 342 that the CIoT device 302 enter a firmware download mode (e.g., be placed in a firmware download mode) via a transistor of the cellular radio of the firmware pusher device 304. In some embodiments, the firmware pusher device 304 requests that a plurality of CIoT devices 302 enter the firmware download mode. For example, the firmware pusher device 304 can request that a cluster of CIoT devices 302 enter a firmware download mode.

In some embodiments, the request 342 can include a security token created by the firmware pusher device 304. The security token can be intended for the CIoT device 302. The security token can be used by the CIoT device 302 and/or the firmware pusher device 304 to initiate an authenticated session and/or secure session.

The service provider 306 receives the request 342 and forwards 344 the request to the cellular network 308. The cellular network 308 forwards 346 the request to the CIoT device 302. That is, the service provider 306 relays commands to the CIoT device 302 via the cellular network 308. The CIoT device 302 receives the request to enter into a firmware download mode (e.g., activation command) via a low throughput and low power radio including an associated receiver. The CIoT device 302 activates 348 a BLE radio including an associated receiver and transmitter based on the activation command received via low throughput and low power radio.

The CIoT device 302 reports 350 entering the firmware download mode. The cellular network 308 receives the report 350 and forwards 352 the report to the service provider 306. The service provider receives the report 350 and forwards 354 the report to the firmware pusher device 304. The firmware pusher device 304 receives the report 350 (e.g., notice) that the CIoT device 302 is in a firmware download mode and pushes 356 the firmware upgrade file to the CIoT device 302 via a BLE radio of the firmware pusher device 304.

Figure 5:
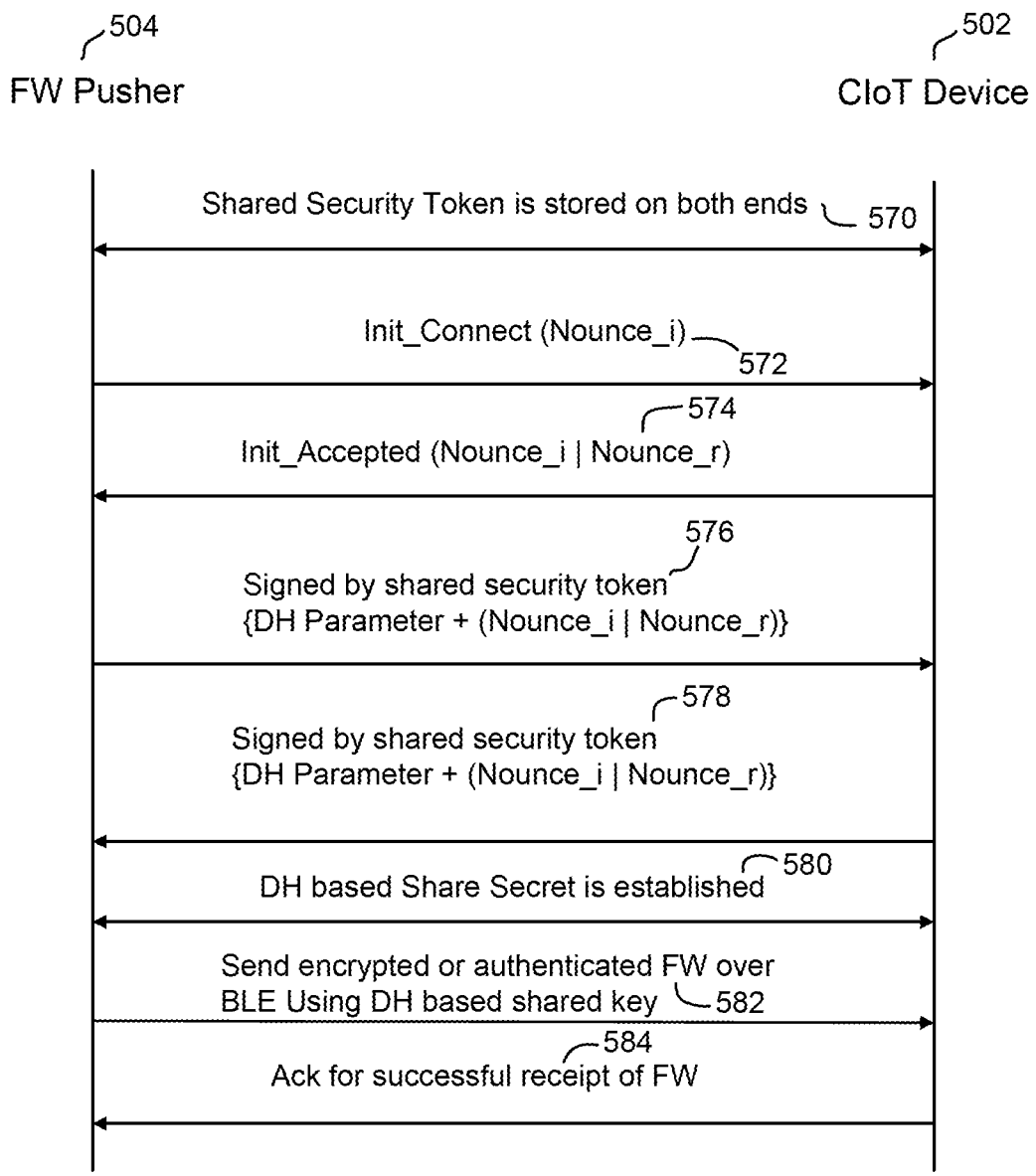
FIG. 5 is a timing diagram for establishing an authenticated session according to one embodiment.

In some embodiments, the firmware pusher device 304 can initiate an authentication session and/or a secure session using the security token provided in the request 342 to enter a firmware download mode. The request to initiate the authenticate session and/or the secure session is provided via the BLE radio of the firmware pusher device 304 and is received via the BLE radio of the CIoT device 302. FIG. 5 further describes an authenticated session and/or a secure session.

The BLE radio is turned off 358 by the CIoT device 302 in response to receipt of the firmware update file. The BLE radio is turned off to conserve power in the CIoT device 302.

Figure 4:
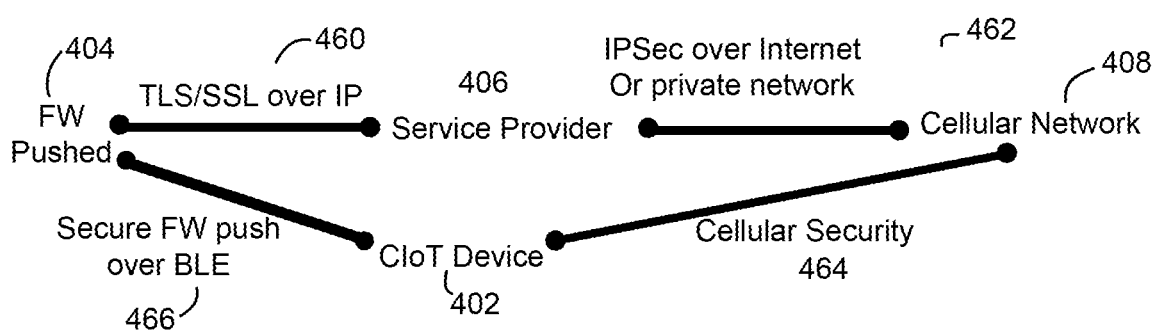
FIG. 4 is a diagram illustrating the security protocols employed in updating a CIoT device with a firmware update file according to one embodiment.

FIG. 4 is a diagram illustrating the security protocols employed in updating a CIoT device with a firmware update file according to one embodiment. FIG. 4 includes a CIoT device 402, a firmware pusher device 404, a service provider 406, and a cellular network 408.

FIG. 4 also shows security protocols employed to secure communications between the firmware pusher device 404 and the service provider 406, the service provider 406 and the cellular network 408, and the cellular network 408 and the CIoT device 402.

For example, communications between the firmware pusher device 404 and the service provider 406 over an internet protocol are secured using a transport layer security (TLS) protocol and/or secure socket layer (SSL) protocol 460. Communications between the service provider 406 and the cellular network 408 over the internet and/or a private network are secured using internet protocol security (IPsec) which is a protocol for secure IP communications by authenticating and encrypting each IP packet of a communication session. Communications between the cellular network 408 and the CIoT device 402 are secured via cellular security 464.

However, in a number of previous approaches, communications between the firmware pusher device 404 and the CIoT device 402 over a BLE protocol are not secured. In some embodiments, communications between the firmware pusher device 404 and the CIoT device 402 are secured as described in FIG. 5.

FIG. 5 is a timing diagram for establishing an authenticated session according to one embodiment. FIG. 5 includes a firmware pusher device 504 and a CIoT device 502. In some embodiments, an authenticated session and/or secure session is established before a firmware update file can be transferred from the firmware pusher device 504 and/or received by the CIoT device 502. A BLE radio of the firmware pusher device 504 is used to transmit messages to the CIoT device 502 and receive messages from the CIoT device 502. A BLE radio of the CIoT device 502 is used to transmit messages to the firmware pusher device 504 and receive messages from the firmware pusher device 504.

As used herein, an authenticated session describes a session wherein the CIoT device 502 confirms that the firmware pusher device 504 is authorized to transmit the firmware download file to the CIoT device 502. A secure session describes a session wherein the communications between the CIoT device 502 and the firmware pusher device 504 are secure from third parties. The authenticated session and/or the secure session can be a Diffie Hellman (DH) session.

The firmware pusher device 504 transmits a security token 570 to the CIoT device 502. The security token 570 is stored in the firmware pusher device 504 and the CIoT device 502. The security token 570 is generated by the firmware pusher device 504. In one embodiment, the security token 570 is a random number.

Establishing a DH session includes establishing a shared secret 580 between the CIoT device 502 and the firmware pusher device 504. The shared secret 580 is used to encrypt 582 and/or authenticate a firmware download file received by the CIoT device 502.

In establishing an authenticated session and/or a secure session, the firmware pusher device 504 can share the security token 570 with the CIoT device 502 to authenticate itself to the CIoT device 502. The security token 570 can be used to establish the DH session.

A request to initiate a connection 572 can be sent from the firmware pusher device 504 to the CIoT device 502. The request to initiate a connection 572 can be accompanied by a first nounce (e.g., Nounce_i) created by the firmware pusher device 504. The request to initiate a connection 572 is accepted 574. The acceptance 574 includes a second nounce (e.g., Nounce_r) created by the CIoT device 502 and the first nounce.

The first and second nounce are combined with a DH parameter and signed with the shared security token. The signed combination of the first nounce, the second nounce, and the DH parameter is sent 576 to the CIoT device 502.

The combination of the first nounce, the second nounce and the DH parameter is also sent 578 from to the firmware pusher device 504. If both the messages sent (e.g., 576 and 578) match, then a DH based shared secret is established 580.

The firmware download file can be encrypted using the DH based shared secret and decrypted using the DH based shared secret. Once the firmware download file is successfully received by the CIoT device 502, then the CIoT device 502 can transmit an acknowledgment 584 of successful receipt of the firmware download file.

FIG. 6 is a block diagram showing a master CIoT device and a plurality of other CIoT devices according to one embodiment. FIG. 6 shows a master CIoT device 602-1 and a plurality of other CIoT devices 602-2, 602-3, 602-4, 602-5, 602-6.

The plurality of other CIoT devices 602-2, 602-3, 602-4, 602-5, 602-6 may be homogenous CIoT devices. The other CIoT devices 602-2, 602-3, 602-4, 602-5, 602-6 may be deployed in a cluster connected via BLE using the Star Topology connectivity paradigm.

In one embodiment, the master CIoT device 602-1 and the other CIoT devices 602-2, 602-3, 602-4, 602-5, 602-6 can communicate with each other via a BLE radio. The master CIoT device 602-1 places the other CIoT devices 602-2, 602-3, 602-4, 602-5, 602-6 in a firmware download mode after receiving a request to place itself and/or the other CIoT devices 602-2, 602-3, 602-4, 602-5, 602-6 in the firmware download mode. Wake on BLT may be used as needed The master CIoT device 602-1 can forward a firmware download file to the other CIoT devices 602-2, 602-3, 602-4, 602-5, 602-6. The master CIoT device 602-1 instructs the other CIoT devices 602-2, 602-3, 602-4, 602-5, 602-6 to deactivate their associated BLE radios to conserve energy. The master CIoT device 602-1 can then deactivate its BLE radio.

In some embodiments, an authenticated/secure session is established between the master CIoT device 602-1 and the other CIoT devices 602-2, 602-3, 602-4, 602-5, 602-6 before the firmware update file is transferred to the CIoT devices 602-2, 602-3, 602-4, 602-5, 602-6.

Figure 7:
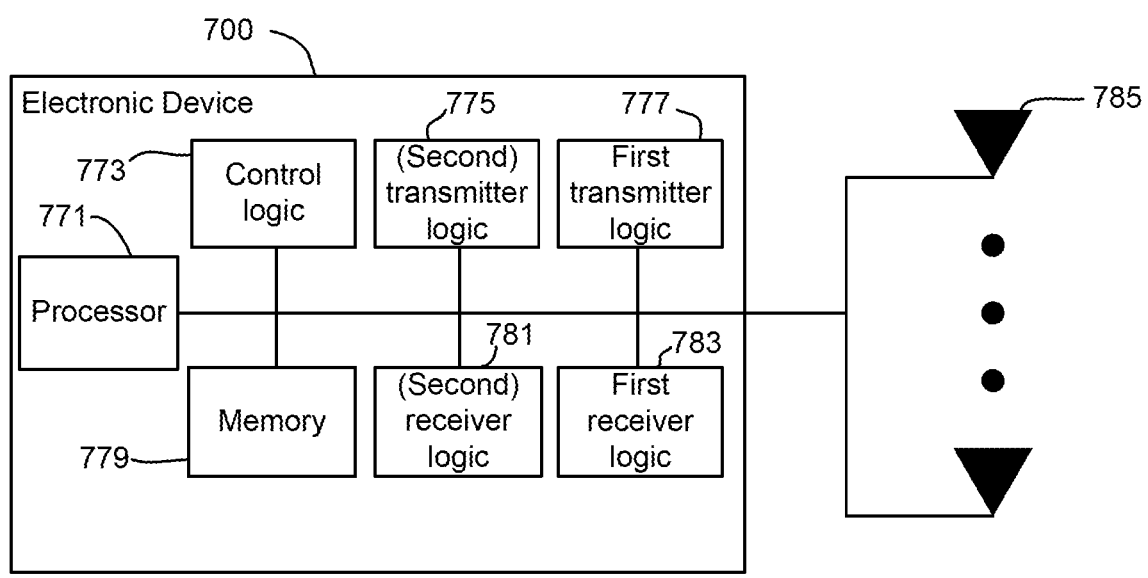
FIG. 7 is a block diagram illustrating electronic device circuitry that may be eNB circuitry, user equipment (UE) circuitry, CIoT device circuitry, network node circuitry, or some other type of circuitry in accordance with various embodiments.

FIG. 7 is a block diagram illustrating electronic device circuitry that may be eNB circuitry, user equipment (UE) circuitry, CIoT device circuitry, network node circuitry, or some other type of circuitry in accordance with various embodiments. FIG. 7 illustrates an electronic device 700 that may be, or may be incorporated into or otherwise part of, an eNB, a UE, a CIoT device, a CIoT eNB, a firmware pusher device, or some other type of electronic device in accordance with various embodiments. In embodiments, the firmware pusher device may be a device that implements all or part of a firmware pusher functionality as hardware, firmware, logic, circuitry, modules, and/or software. Specifically, the electronic device may be logic and/or circuitry that may be at least partially implemented in one or more of hardware, software, and/or firmware. In embodiments, the electronic device logic may include radio transmit/transmitter logic (e.g., a first transmitter logic 777 and a second transmitter logic 775) and receive/receiver logic (e.g., a first receiver logic 783 and a second receiver logic 781) coupled to control logic 773 and/or a processor 771. In embodiments, the transmit/transmitter and/or receive/receiver logic may be elements or modules of transceiver logic. The electronic device 700 may be coupled with or include one or a plurality of antenna elements 785 of one or more antennas. The electronic device 700 and/or the components of the electronic device 700 may be configured to perform operations similar to those described elsewhere in this disclosure.

In embodiments where the electronic device 700 is, implements, is incorporated into, or is otherwise part of a CIoT device or CIoT UE, or device portion thereof, that is implementing a secure firmware upgrade for CIoT, a first receiver and a first transmitter may receive and send low-power CIoT signals. A second receiver and a second transmitter may receive and send high-power signals. The processor 771 may be coupled to the first receiver, first transmitter, second receiver, and second transmitter. A memory 779 may be coupled to the processor having control logic instructions thereon that when executed may be to activate the second receiver, connect to a firmware pusher device, receive a firmware upgrade file, and deactivate the second receiver.

In embodiments where the electronic device is a firmware pusher, or is implemented into or otherwise part of a firmware pusher that is implementing a secure firmware upgrade for CIoT, a processor 771 may be coupled to a receiver and a transmitter. A memory 779 may be coupled to the processor having control logic 773 instructions thereon that when executed may be to receive a firmware upgrade file to download to a CIoT UE device, send a request to the CIoT UE device to activate its transceiver and to enter into download mode, receive an acknowledgment from the CIoT UE device that its transceiver is activated and is in download mode, and/or send the received firmware file to the CIoT UE device.

As used herein, the term "logic" may refer to, be part of, or include an Application Specific Integrated Circuit (ASIC), an electronic circuit, a processor (shared, dedicated, or group), and/or memory 779 (shared, dedicated, or group) that execute one or more software or firmware programs, a combinational logic circuit, and/or other suitable hardware components that provide the described functionality. Specifically, the logic may be at least partially implemented in, or an element of, hardware, software, and/or firmware. In some embodiments, the electronic device logic may be implemented in, or functions associated with the logic may be implemented by, one or more software or firmware modules.

Figure 8:
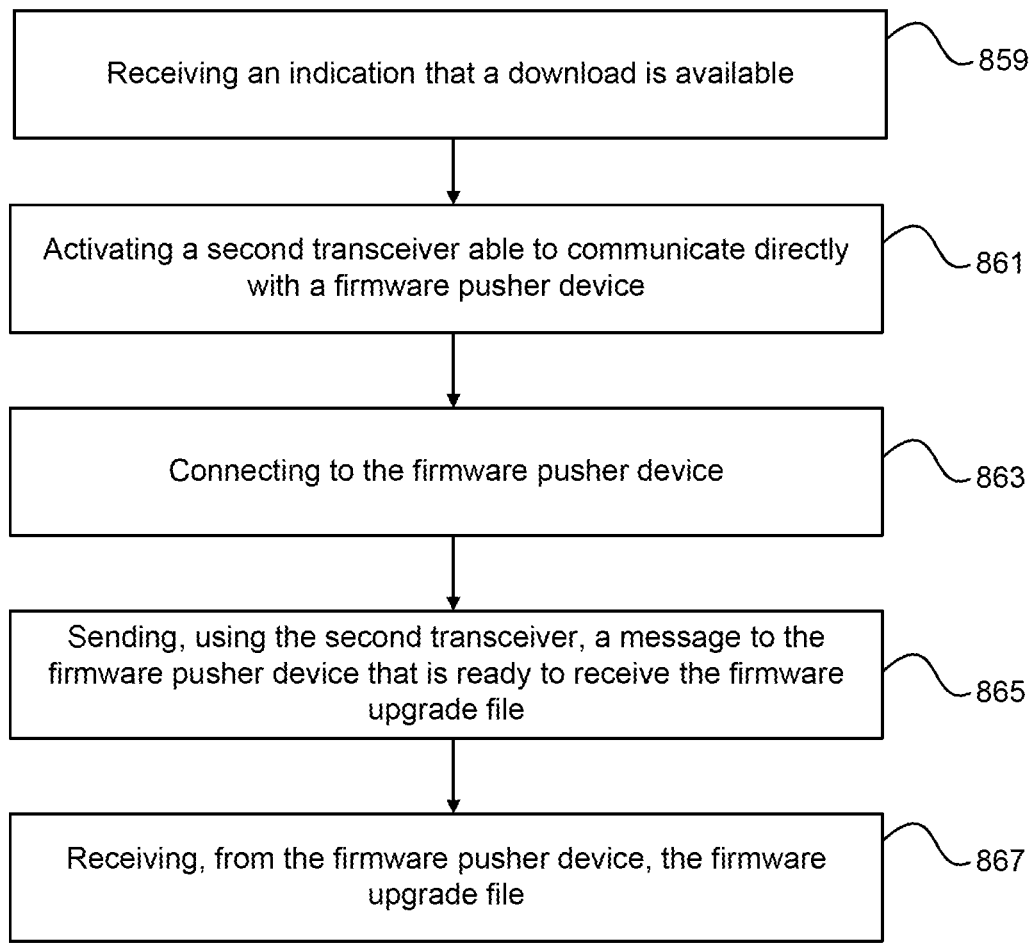
FIG. 8 is a block diagram illustrating a method for secure firmware upgrade for CIoT devices according to one embodiment.

FIG. 8 is a block diagram illustrating a method for secure firmware upgrade for CIoT devices according to one embodiment. In some embodiments, the electronic device of FIG. 7 may be configured to perform one or more processes such as the process of FIG. 8. For example, in embodiments where the electronic device is, implements, is incorporated into, or is otherwise part of a CIoT UE or a portion of a CIoT UE, the process may include receiving 859, by the CIoT UE device, from a CIoT eNB, an indication that a download is available. The process may further include activating 861, by the CIoT UE device, a second transceiver able to communicate directly with a firmware pusher device. The process may further include connecting 863, by the CIoT UE device, to the firmware pusher device. The process may further include sending 865, by the CIoT UE device, using the second transceiver, a message to the firmware pusher device that it is ready to receive the firmware upgrade file. The process may further include receiving 867, by the CIoT UE device from the firmware pusher device, the firmware upgrade file. In some examples, the one or more activation commands are attention (AT) commands.

Figure 9:
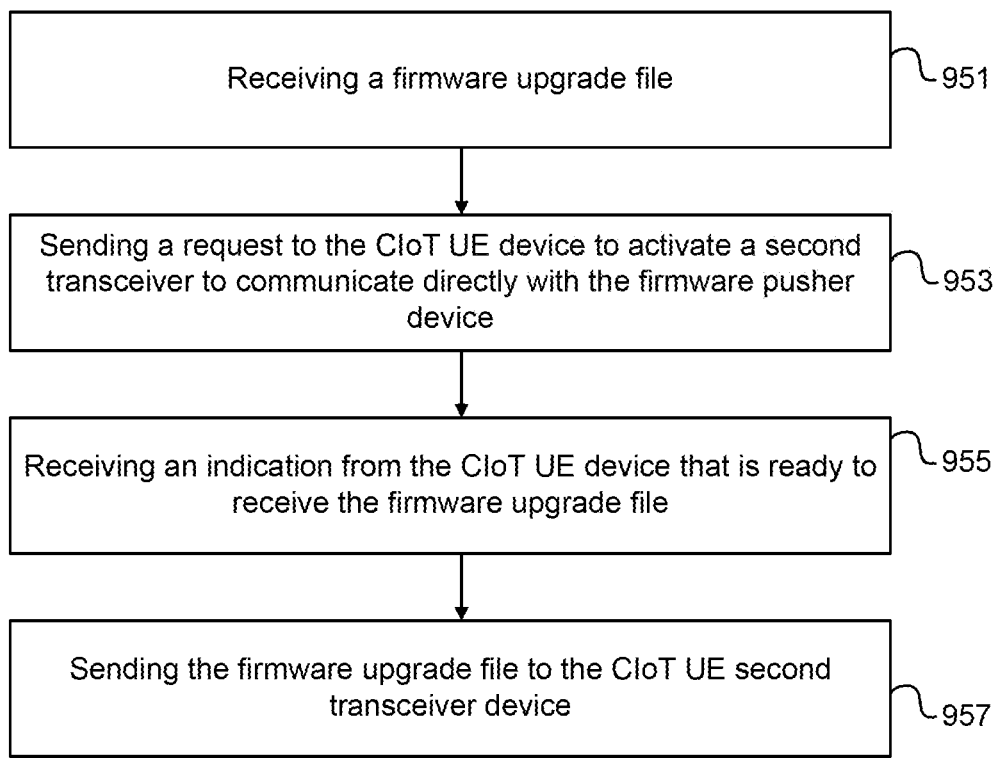
FIG. 9 is a block diagram illustrating a method for secure firmware upgrade for CIoT devices according to one embodiment.

FIG. 9 is a block diagram illustrating a method for secure firmware upgrade for CIoT devices according to one embodiment. In some embodiments, the electronic device of FIG. 7 may be configured to perform one or more processes such as the process of FIG. 9. For example, in embodiments where the electronic device is, implements, is incorporated into, or is otherwise part of a firmware pusher device or a portion of a firmware pusher device, the process may include receiving 951, by the firmware pusher device, a firmware upgrade file. The process may further include sending 953, by the firmware pusher device through a CIoT eNB, a request to the CIoT UE device to activate a second transceiver to communicate directly with the firmware pusher device. The process may further include receiving 955, by the firmware pusher device, an indication from the CIoT UE device that it is ready to receive the firmware upgrade file. The process may further include sending 957, by the firmware pusher device, the firmware upgrade file to the CIoT UE second transceiver device.

In some examples, the firmware update file and the notice can be received via at least one of a physical downlink control channel (PDCCH) and a physical downlink shared channel (PDSCH). The request can be provided via at least one of a physical uplink control channel (PUCCH) and a physical uplink shared channel (PUSCH).

Figure 10:
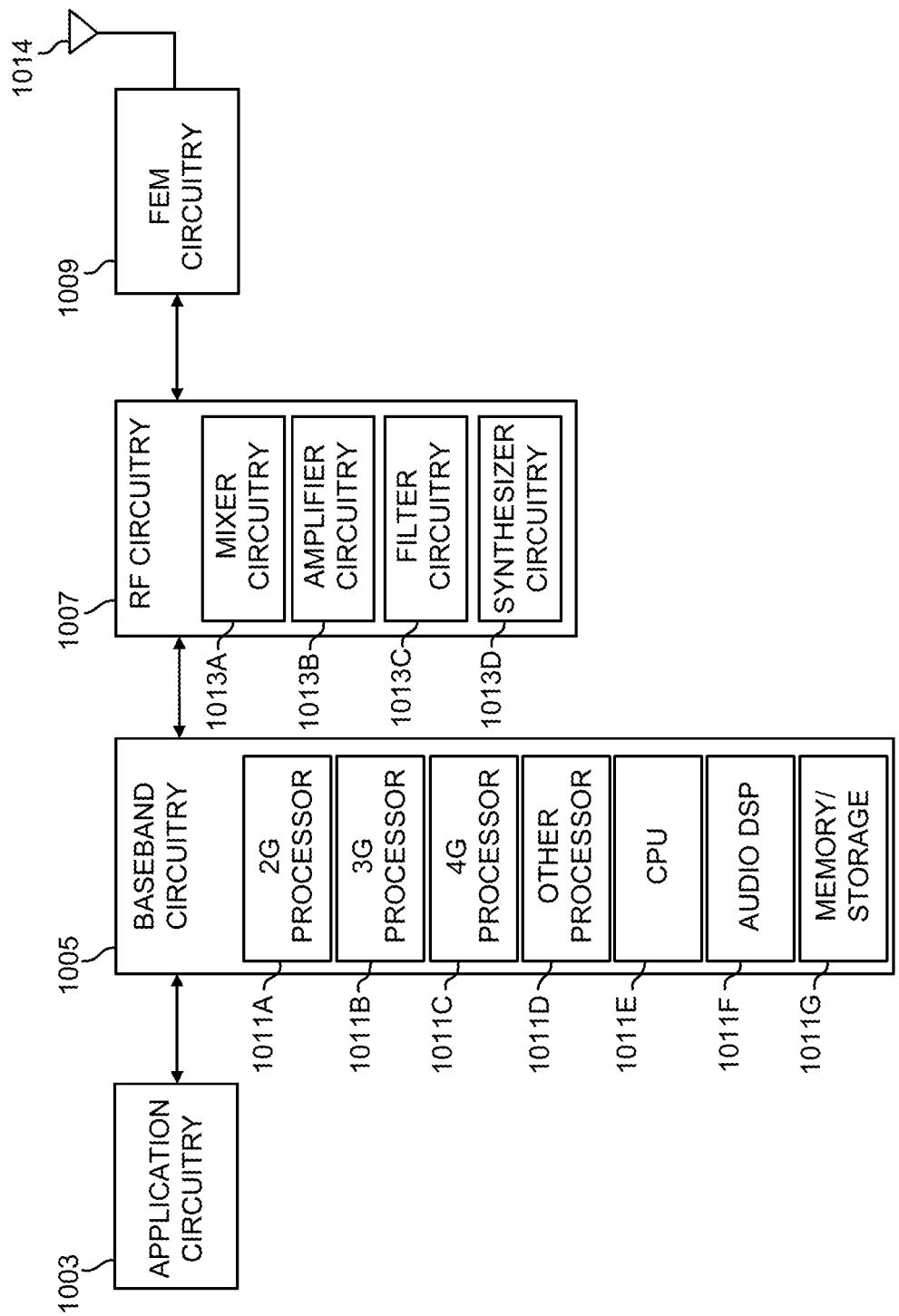
FIG. 10 is a block diagram illustrating components of a UE device according to one embodiment.

FIG. 10 is a block diagram illustrating components of a UE device according to one embodiment. In some embodiments, the UE device may include application circuitry 1003, baseband circuitry 1005, Radio Frequency (RF) circuitry 1007, front-end module (FEM) circuitry 1009, and one or more antennas 1014, coupled together at least as shown in FIG. 10.

The application circuitry 1003 may include one or more application processors. By way of non-limiting example, the application circuitry 1003 may include one or more single-core or multi-core processors. The processor(s) may include any combination of general-purpose processors and dedicated processors (e.g., graphics processors, application processors, etc.). The processor(s) may be operably coupled and/or include memory/storage, and may be configured to execute instructions stored in the memory/storage to enable various applications and/or operating systems to run on the system.

By way of non-limiting example, the baseband circuitry 1005 may include one or more single-core or multi-core processors. The baseband circuitry 1005 may include one or more baseband processors and/or control logic. The baseband circuitry 1005 may be configured to process baseband signals received from a receive signal path of the RF circuitry 1007. The baseband circuitry 1005 may also be configured to generate baseband signals for a transmit signal path of the RF circuitry 1007. The baseband processing circuitry 1005 may interface with the application circuitry 1003 for generation and processing of the baseband signals, and for controlling operations of the RF circuitry 1007.

By way of non-limiting example, the baseband circuitry 1005 may include at least one of a second generation (2G) baseband processor 1011A, a third generation (3G) baseband processor 1011B, a fourth generation (4G) baseband processor 1011C, other baseband processor(s) 1011D for other existing generations, and generations in development or to be developed in the future (e.g., fifth generation (5G), 6G, etc.). The baseband circuitry 1005 (e.g., at least one of baseband processors 1011A-1011D) may handle various radio control functions that enable communication with one or more radio networks via the RF circuitry 1007. By way of non-limiting example, the radio control functions may include signal modulation/demodulation, encoding/decoding, radio frequency shifting, other functions, and combinations thereof. In some embodiments, modulation/demodulation circuitry of the baseband circuitry 1005 may be programmed to perform Fast-Fourier Transform (FFT), precoding, constellation mapping/demapping functions, other functions, and combinations thereof. In some embodiments, encoding/decoding circuitry of the baseband circuitry 1005 may be programmed to perform convolutions, tail-biting convolutions, turbo, Viterbi, Low Density Parity Check (LDPC) encoder/decoder functions, other functions, and combinations thereof. Embodiments of modulation/demodulation and encoder/decoder functions are not limited to these examples, and may include other suitable functions.

In some embodiments, the baseband circuitry 1005 may include elements of a protocol stack. By way of non-limiting example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1011E of the baseband circuitry 1005 may be programmed to run elements of the protocol stack for signaling of the PHY, MAC, RLC, PDCP and/or RRC layers. In some embodiments, the baseband circuitry 1005 may include one or more audio digital signal processor(s) (DSP) 1011F. The audio DSP(s) 1011F may include elements for compression/decompression and echo cancellation. The audio DSP(s) 1011F may also include other suitable processing elements.

The baseband circuitry 1005 may further include memory/storage 1011G. The memory/storage 1011G may include data and/or instructions for operations performed by the processors of the baseband circuitry 1005 stored thereon. In some embodiments, the memory/storage 1011G may include any combination of suitable volatile memory and/or non-volatile memory. The memory/storage 1011G may also include any combination of various levels of memory/storage including, but not limited to, read-only memory (ROM) having embedded software instructions (e.g., firmware), random access memory (e.g., dynamic random access memory (DRAM)), cache, buffers, etc. In some embodiments, the memory/storage 1011G may be shared among the various processors or dedicated to particular processors.

Components of the baseband circuitry 1005 may be suitably combined in a single chip or a single chipset, or disposed on a same circuit board in some embodiments. In some embodiments, some or all of the constituent components of the baseband circuitry 1005 and the application circuitry 1003 may be implemented together, such as, for example, on a system on a chip (SOC).

In some embodiments, the baseband circuitry 1005 may provide for communication compatible with one or more radio technologies. For example, in some embodiments, the baseband circuitry 1005 may support communication with an evolved universal terrestrial radio access network (EUTRAN) and/or other wireless metropolitan area networks (WMAN), a wireless local area network (WLAN), or a wireless personal area network (WPAN). Embodiments in which the baseband circuitry 1005 is configured to support radio communications of more than one wireless protocol may be referred to as multi-mode baseband circuitry.

The RF circuitry 1007 may enable communication with wireless networks using modulated electromagnetic radiation through a non-solid medium. In various embodiments, the RF circuitry 1007 may include switches, filters, amplifiers, etc. to facilitate the communication with the wireless network. The RF circuitry 1007 may include a receive signal path which may include circuitry to down-convert RF signals received from the FEM circuitry 1009, and provide baseband signals to the baseband circuitry 1005. The RF circuitry 1007 may also include a transmit signal path which may include circuitry to up-convert baseband signals provided by the baseband circuitry 1005, and provide RF output signals to the FEM circuitry 1009 for transmission.

In some embodiments, the RF circuitry 1007 may include a receive signal path and a transmit signal path. The receive signal path of the RF circuitry 1007 may include mixer circuitry 1013A, amplifier circuitry 1013B, and filter circuitry 1013C. The transmit signal path of the RF circuitry 1007 may include filter circuitry 1013C and mixer circuitry 1013A. The RF circuitry 1007 may further include synthesizer circuitry 1013D configured to synthesize a frequency for use by the mixer circuitry 1013A of the receive signal path and the transmit signal path. In some embodiments, the mixer circuitry 1013A of the receive signal path may be configured to down-convert RF signals received from the FEM circuitry 1009 based on the synthesized frequency provided by synthesizer circuitry 1013D. The amplifier circuitry 1013B may be configured to amplify the down-converted signals.

The filter circuitry 1013C may include a low-pass filter (LPF) or band-pass filter (BPF) configured to remove unwanted signals from the down-converted signals to generate output baseband signals. Output baseband signals may be provided to the baseband circuitry 1005 for further processing. In some embodiments, the output baseband signals may include zero-frequency baseband signals, although this is not a requirement. In some embodiments, the mixer circuitry 1013A of the receive signal path may comprise passive mixers, although the scope of the embodiments is not limited in this respect.

In some embodiments, the mixer circuitry 1013A of the transmit signal path may be configured to up-convert input baseband signals based on the synthesized frequency provided by the synthesizer circuitry 1013D to generate RF output signals for the FEM circuitry 1009. The baseband signals may be provided by the baseband circuitry 1005 and may be filtered by filter circuitry 1013C. The filter circuitry 1013C may include a low-pass filter (LPF), although the scope of the embodiments is not limited in this respect.

In some embodiments, the mixer circuitry 1013A of the receive signal path and the mixer circuitry 1013A of the transmit signal path may include two or more mixers, and may be arranged for quadrature downconversion and/or upconversion, respectively. In some embodiments, the mixer circuitry 1013A of the receive signal path and the mixer circuitry 1013A of the transmit signal path may include two or more mixers and may be arranged for image rejection (e.g., Hartley image rejection). In some embodiments, the mixer circuitry 1013A of the receive signal path and the mixer circuitry 1013A of the transmit signal path may be arranged for direct downconversion and/or direct upconversion, respectively. In some embodiments, the mixer circuitry 1013A of the receive signal path and the mixer circuitry 1013A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In such embodiments, the RF circuitry 1007 may include analog-to-digital converter (ADC) and digital-to-analog converter (DAC) circuitry, and the baseband circuitry 1005 may include a digital baseband interface to communicate with the RF circuitry 1007.

In some dual-mode embodiments, separate radio IC circuitry may be provided for processing signals for each spectrum, although the scope of the embodiments is not limited in this respect.

In some embodiments, the synthesizer circuitry 1013D may include one or more of a fractional-N synthesizer and a fractional N/N+1 synthesizer, although the scope of the embodiments is not limited in this respect as other types of frequency synthesizers may be suitable. For example, synthesizer circuitry 1013D may include a delta-sigma synthesizer, a frequency multiplier, a synthesizer comprising a phase-locked loop with a frequency divider, other synthesizers and combinations thereof.

The synthesizer circuitry 1013D may be configured to synthesize an output frequency for use by the mixer circuitry 1013A of the RF circuitry 1007 based on a frequency input and a divider control input. In some embodiments, the synthesizer circuitry 1013D may be a fractional N/N+1 synthesizer.

In some embodiments, frequency input may be provided by a voltage controlled oscillator (VCO), although that is not a requirement. Divider control input may be provided by either the baseband circuitry 1005 or the applications processor 1003 depending on the desired output frequency. In some embodiments, a divider control input (e.g., N) may be determined from a look-up table based on a channel indicated by the applications processor 1003.

The synthesizer circuitry 1013D of the RF circuitry 1007 may include a divider, a delay-locked loop (DLL), a multiplexer and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In such embodiments, the delay elements may be configured to break a VCO period up into Nd equal packets of phase, where Nd is the number of delay elements in the delay line. In this way, the DLL may provide negative feedback to help ensure that the total delay through the delay line is one VCO cycle.

In some embodiments, the synthesizer circuitry 1013D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be a LO frequency (fLO). In some embodiments, the RF circuitry 1005 may include an IQ/polar converter.

The FEM circuitry 1009 may include a receive signal path which may include circuitry configured to operate on RF signals received from one or more antennas 1014, amplify the received signals, and provide the amplified versions of the received signals to the RF circuitry 1007 for further processing. The FEM circuitry 1009 may also include a transmit signal path which may include circuitry configured to amplify signals for transmission provided by the RF circuitry 1007 for transmission by at least one of the one or more antennas 1014.

In some embodiments, the FEM circuitry 1009 may include a TX/RX switch configured to switch between a transmit mode and a receive mode operation. The FEM circuitry 1009 may include a receive signal path and a transmit signal path. The receive signal path of the FEM circuitry 1009 may include a low-noise amplifier (LNA) to amplify received RF signals and provide the amplified received RF signals as an output (e.g., to the RF circuitry 1007). The transmit signal path of the FEM circuitry 1009 may include a power amplifier (PA) configured to amplify input RF signals (e.g., provided by RF circuitry 1007), and one or more filters configured to generate RF signals for subsequent transmission (e.g., by one or more of the one or more antennas 1014.

In some embodiments, the UE device may include additional elements such as, for example, memory/storage, a display, a camera, one of more sensors, an input/output (I/O) interface, other elements, and combinations thereof.

In some embodiments, the UE device may be configured to perform one or more processes, techniques, and/or methods as described herein, or portions thereof.

EXAMPLE EMBODIMENTS

Example 1 is an apparatus for a cellular internet of things (CIoT) device. The apparatus includes a first receiver and a first transmitter to receive and send low-power CIoT signals. The apparatus includes a second receiver and a second transmitter to receive and send high-power signals. The apparatus includes an electronic memory. The apparatus also includes one or more processors designed to access the electronic memory, the first receiver and the first transmitter, and the second receiver and the second transmitter. The one or more processors are designed to activate the second receiver, based on one or more activation commands received by the first receiver. The one or more processors are designed to connect, by the second receiver and the second transmitter, to a device. The one or more processors are designed to receive, by the second receiver, from the device, a firmware upgrade file, and deactivate the second receiver.

Example 2 is the apparatus of Example 1, where the first receiver and the second transmitter are a cellular radio implementing a 3rd Generation Partnership Project (3GPP) long term evolution (LTE) standard.

Example 3 is the apparatus of Example 1, where the second receiver and the second transmitter are a low range high throughput radio.

Example 4 is the apparatus of Example 1, where the low range high throughput radio is at least one of a Bluetooth low energy radio, a low power Wi-Fi radio, and a Zigbee radio.

Example 5 is the apparatus of Example 1, where the one or more processors are further designed to update the CIoT device with the firmware upgrade file.

Example 6 is the apparatus of Example 1, where the one or more processors are designed to update the CIoT device with the firmware upgrade file are further designed to push the firmware upgrade file to a group of other CIoT devices to update the range of other CIoT devices via at least one of the first transmitter and the second transmitter.

Example 7 is the apparatus of Example 6, where the one or more processors are further designed to place the other CIoT devices in a download mode via the first transmitter.

Example 8 is the apparatus of Example 6, where the CIoT device is a master device.

Example 9 is the apparatus of Example 6, where the firmware upgrade file is pushed to the group of other CIoT devices using a star topology connectivity paradigm.

Example 10 is the apparatus device of Example 1, where the one or more processors are further designed to receive an activation command to place the CIoT device in firmware download mode via the first receiver.

Example 11 is the apparatus device of Example 1, where the one or more processors are further designed to report, via the first transmitter, that the CIoT device is ready to receive the firmware update file.

Example 12 is the apparatus device of Example 1, where the one or more processors are further designed to deactivate the alternate high throughput radio in response to receiving the firmware from the device.

Example 13 is the apparatus device of Example 1, where the one or more processors are further designed to deactivate the second receiver in response to a predetermined lapse of time without receiving the firmware update file.

Example 14 is an apparatus for a device. The apparatus includes a cellular radio to receive and send LTE standard signals. The apparatus includes a low range high throughput radio to receive and send high-power signals. The apparatus includes electronic memory. The apparatus includes one or more processors designed to access the electronic memory, the cellular radio, and the low range high throughput radio. The one or more processors are designed to receive a firmware update file from a service provider via the cellular radio and request that a cellular internet of things (CIoT) device enter a firmware download mode via the cellular radio, where the request is provided to the service provider. The one or more processors are further designed to receive a notice that the CIoT device is in the firmware download mode, and initiate an authenticated session with the CIoT device over the low range high throughput radio. The one or more processors are further designed to provide the firmware upgrade file to the CIoT device in response to a completion of the authenticated session.

Example 15 is the apparatus of Example 14, where the firmware update file and the notice are received via at least one of a physical downlink control channel (PDCCH) and a physical downlink shared channel (PDSCH).

Example 16 is the apparatus of Example 14, where the request is provided via at least one of a physical uplink control channel (PUCCH) and a physical uplink shared channel (PUSCH).

Example 17 is the apparatus of Example 14, where the device is an application running on at least one of a personal computer, a smart phone, or a tablet.

Example 18 is the apparatus of Example 14, where the device is a dedicated pushing device.

Example 19 is the apparatus of Example 14, where the one or more processors designed to request that the CIoT device enter the firmware download mode are further designed to provide a security token to the CIoT.

Example 20 is the apparatus of Example 19, where the security token is a random number.

Example 21 is the apparatus of Example 20, where the authentication session is established using the security token.

Example 22 is the apparatus of Example 21, where the authentication session is a Diffie Hellman (DH) session.

Example 23 is the apparatus of Example 14, where the firmware upgrade file is encrypted before it is provided to the CIoT device.

Example 24 is the apparatus of Example 14, where the device uses an open mobile alliance (OMA) lightweight (LW) machine to machine (M2M) protocol.

Example 25 is the apparatus of Example 14, where the one or more processors designed to request that the CIoT device enter the firmware download mode are further designed to request that a CIoT device enter the firmware download mode in response to a determination the CIoT device is due for an upgrade in view of an install policy.

Example 26 is a computer-readable storage medium having stored thereon instructions that, when implemented by a computing device, cause the computing device to upgrade firmware of a cellular internet of things (CIoT) device. The operations of the computer-readable storage medium include pushing a firmware update file to a device via a first eNB, and sending an activation command to the CIoT device via a second eNB. The operations of the computer-readable storage medium further include receiving a notice that the CIoT device is in a download mode, and notifying the device that the CIoT device is in the download mode.

Example 27 is the computer-readable storage medium of Example 26, where the first eNB is designed to receive and send low-power CIoT signals and the second eNB is designed to receive and send high-power CIoT signals.

Example 28 is a method. The method includes activating a second receiver of a cellular internet of things (CIoT) device, based on one or activation commands received by a first receiver of the CIoT device, where the first receiver receives low-power CIoT signals. The method includes connecting, by the second receiver and an associated transmitter of the CIoT device, to a device, where the second receiver and the associated transmitter are designed to receive and generate high-power signals. The method further includes receiving, by the second receiver, from the device, a firmware upgrade file, and deactivating the second receiver.

Example 29 is the method of Example 28, where the first receiver and the associated transmitter are a cellular radio implementing a 3rd Generation Partnership Project (3GPP) long term evolution (LTE) standard.

Example 30 is the method of Example 28, where the second receiver and the associated transmitter are a low range high throughput radio.

Example 31 is the method of Example 28, where the low range high throughput radio is at least one of a Bluetooth low energy radio, a low power Wi-Fi radio, and a Zigbee radio.

In Example 32, the method of Example 28, further includes updating the CIoT device with the firmware upgrade file.

Example 33 is the method of Example 28, where updating the CIoT device with the firmware upgrade file further includes pushing the firmware upgrade file to a variety of other CIoT devices to update the range of other CIoT devices via at least one of a first transmitter and the associated transmitter.

In Example 34, the method of Example 33, further includes placing the other CIoT devices in a download mode via the first transmitter.

Example 35 is the method of Example 33, where the CIoT device is a master device.

Example 36 is the method of Example 33, where the firmware upgrade file is pushed to the group of other CIoT devices using a star topology connectivity paradigm.

In Example 37, the method of Example 28, further includes receiving an activation command to place the CIoT device in firmware download mode via the first receiver.

In Example 38, the method of Example 28, further includes reporting, via the first transmitter, that the CIoT device is ready to receive the firmware update file.

In Example 39, the method of Example 28, further includes deactivating the alternate high throughput radio in response to receiving the firmware from the device.

In Example 40, the method of Example 28, further includes deactivating the second receiver in response to a predetermined lapse of time without receiving the firmware update file.

Example 41 is a method. The method includes receiving a firmware update file from a service provider via a cellular radio designed to receive and send LTE standard signals. The method includes requesting that a cellular internet of things (CIoT) device enter a firmware download mode via the cellular radio, where the request is provided to the service provider. The method includes receiving a notice that the CIoT device is in the firmware download mode, and initiating an authenticated session with the CIoT device over a low range high throughput radio designed to receive and send high-power signals. The method further includes providing the firmware upgrade file to the CIoT device in response to a completion of the authenticated session.

Example 42 is the method of Example 41, where the firmware update file and the notice are received via at least one of a physical downlink control channel (PDCCH) and a physical downlink shared channel (PDSCH).

Example 43 is the method of Example 41, where the request is provided via at least one of a physical uplink control channel (PUCCH) and a physical uplink shared channel (PUSCH).

Example 44 is the method of Example 41, where the device is an application running on at least one of a personal computer, a smart phone, or a tablet.

Example 45 is the method of Example 41, where the device is a dedicated pushing device.

Example 46 is the method of Example 41, where requesting that the CIoT device enter the firmware download mode further includes providing a security token to the CIoT.

Example 47 is the method of Example 46, where the security token is a random number.

Example 48 is the method of Example 47, where the authentication session is established using the security token.

Example 49 is the method of Example 47, where the authentication session is a Diffie Hellman (DH) session.

Example 50 is the method of Example 41, where the firmware upgrade file is encrypted before it is provided to the CIoT device.

Example 51 is the method of Example 41, where the device uses an open mobile alliance (OMA) lightweight (LW) machine to machine (M2M) protocol.

Example 52 is the method of Example 41, where requesting that the CIoT device enter the firmware download mode further includes requesting that the CIoT device enter the firmware download mode in response to a determination the CIoT device is due for an upgrade in view of an install policy.

Example 53 is a method. The method includes pushing a firmware update file to a device via a first eNB. The method includes sending an activation command to a cellular internet of things (CIoT) device via a second eNB. The method further includes receiving a notice that the CIoT device is in a download mode, and notifying the device that the CIoT device is in the download mode.

Example 54 is the method of Example 53, where the first eNB is designed to receive and send low-power CIoT signals and the second eNB is designed to receive and send high-power CIoT signals.

In Example 55 at least one computer-readable storage medium has stored thereon computer-readable instructions, which, when executed, implement a method as explained in any of Examples 28-54.

In Example 56 an apparatus including method to perform a method as explained in any of Examples 28-54.

The described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

It will be understood by those having skill in the art that many changes may be made to the details of the above-described embodiments without departing from the underlying principles of the invention. The scope of the present invention should, therefore, be determined only by the following claims.

The invention claimed is:

1. An apparatus for a cellular internet of things (CIoT) device, comprising:
   a first receiver and a first transmitter to receive and send low-power CIoT signals from and to a cellular network;
   a second receiver and a second transmitter to receive and send high-power signals from and to a wireless firmware update device that is separate from the CIoT device;
   electronic memory; and
   one or more processors configured to access the electronic memory, the first receiver and the first transmitter, and the second receiver and the second transmitter, the one or more processors further configured to:
   activate the second receiver, based on one or more activation commands received by the first receiver from the cellular network;
   wirelessly connect, by the second receiver and the second transmitter, to the wireless firmware update device;
   receive, by the second receiver, from the wireless firmware update device, a firmware upgrade file to be used to update the CIoT device; and
   deactivate the second receiver.

2. The apparatus of claim 1, wherein the first receiver and the second transmitter are a cellular radio implementing a 3rd Generation Partnership Project (3GPP) long term evolution (LTE) standard.

3. The apparatus of claim 1, wherein the second receiver and the second transmitter are a low range high throughput radio.

4. The apparatus of claim 1, wherein the low range high throughput radio is at least one of a Bluetooth low energy radio, a low power Wi-Fi radio, and a Zigbee radio.

5. The apparatus of claim 1, wherein the one or more processors are further configured to update the CIoT device with the firmware upgrade file.

6. The apparatus of claim 1, wherein the one or more processors configured to update the CIoT device with the firmware upgrade file are further configured to push the firmware upgrade file to a plurality of other CIoT devices to update the plurality of other CIoT devices via at least one of the first transmitter and the second transmitter.

7. The apparatus of claim 6, wherein the one or more processors are further configured to place the other CIoT devices in a download mode via the first transmitter.

8. The apparatus of claim 6, wherein the CIoT device is a master device.

9. The apparatus of claim 6, wherein the firmware upgrade file is pushed to the plurality of other CIoT devices using a star topology connectivity paradigm.

10. The apparatus of claim 1, wherein the one or more processors are further configured receive an activation command to place the CIoT device in firmware download mode via the first receiver.

11. The apparatus of claim 1, wherein the one or more processors are further configured to report, via the first transmitter, that the CIoT device is ready to receive the firmware update file.

12. The apparatus of claim 1, wherein the one or more processors are further configured to deactivate the alternate high throughput radio in response to receiving the firmware from the wireless firmware update device.

13. The apparatus of claim 1, wherein the one or more processors are further configured to deactivate the second receiver in response to a predetermined lapse of time without receiving the firmware update file.

14. An apparatus for a wireless firmware update device, comprising:
 a cellular radio to receive and send LTE standard signals;
 a low range high throughput radio to receive and send high-power signals;
 electronic memory; and
 one or more processors configured to access the electronic memory, the cellular radio, and the low range high throughput radio, the one or more processors further configured to:
  receive a firmware update file from a service provider via the cellular radio;
  send a request to the service provider that a cellular internet of things (CIoT) device enter a firmware download mode via the cellular radio;
  receive a notice from the service provider via the cellular radio that the CIoT device is in the firmware download mode;
  initiate an authenticated session with the CIoT device over the low range high throughput radio; and
  provide the firmware upgrade file to the CIoT device over the low range high throughput radio in response to a completion of the authenticated session.

15. The apparatus of claim 14, wherein the firmware update file and the notice are received via at least one of a physical downlink control channel (PDCCH) and a physical downlink shared channel (PDSCH).

16. The apparatus of claim 14, wherein the request is provided via at least one of a physical uplink control channel (PUCCH) and a physical uplink shared channel (PUSCH).

17. The apparatus of claim 14, wherein the wireless firmware update device is an application running on at least one of a personal computer, a smart phone, or a tablet.

18. The apparatus of claim 14, wherein the wireless firmware update device is a dedicated pushing device.

19. The apparatus of claim 14, wherein the one or more processors configured to request that the CIoT device enter the firmware download mode are further configured to provide a security token to the CIoT device.

20. The apparatus of claim 19, wherein the security token is a random number.

21. The apparatus of claim 20, wherein the authentication session is established using the security token.

22. The apparatus of claim 21, wherein the authentication session is a Diffie Hellman (DH) session.

23. The apparatus of claim 14, wherein the firmware upgrade file is encrypted before it is provided to the CIoT device.

24. The apparatus of claim 14, wherein the wireless firmware update device uses an open mobile alliance (OMA) lightweight (LW) machine to machine (M2M) protocol.

25. The apparatus of claim 14, wherein the one or more processors configured to request that the CIoT device enter the firmware download mode are further configured to request that a CIoT device enter the firmware download mode in response to a determination the CIoT device is due for an upgrade in view of an install policy.

26. A computer-readable storage medium having stored thereon instructions that, when implemented by a computing device of a service provider, cause the computing device to upgrade firmware of a cellular internet of things (CIoT) device, the operations comprising:
 push a firmware update file to a wireless firmware update device via a first eNB;
 send an activation command to the CIoT device via a second eNB;
 receive a notice from the CIoT device that the CIoT device is in a download mode via the second eNB; and
 notify the wireless firmware update device that the CIoT device is in the download mode via the first eNB.

27. The computer-readable storage medium of claim 26, wherein the first eNB is configured to receive and send low-power CIoT signals and the second eNB is configured to receive and send high-power CIoT signals.

* * * * *